(12) United States Patent
Marchione et al.

(10) Patent No.: US 10,857,599 B2
(45) Date of Patent: Dec. 8, 2020

(54) DAMPED BORING BAR

(71) Applicant: Caterpillar Inc., Deerfield, IL (US)

(72) Inventors: Thierry A. Marchione, Herber City, UT (US); Kevin L. Martin, Washburn, IL (US); Rohit A. Bhapkar, Dunlap, IL (US)

(73) Assignee: Caterpiller Inc., Peoria, IL (US)

( * ) Notice: Subject to any disclaimer, the term of this patent is extended or adjusted under 35 U.S.C. 154(b) by 0 days.

(21) Appl. No.: 16/248,518

(22) Filed: Jan. 15, 2019

(65) Prior Publication Data

US 2020/0222990 A1    Jul. 16, 2020

(51) Int. Cl.
*B23B 29/02*     (2006.01)
*B33Y 80/00*     (2015.01)

(52) U.S. Cl.
CPC ............ *B23B 29/022* (2013.01); *B33Y 80/00* (2014.12)

(58) Field of Classification Search
CPC ............................ B33Y 80/00; B23B 29/022
See application file for complete search history.

(56) References Cited

U.S. PATENT DOCUMENTS

| 2,641,940 | A | 6/1953 | White |
| 3,230,833 | A * | 1/1966 | Shurtliff ............... B23B 29/022 409/141 |
| 6,299,391 | B1 | 10/2001 | Endsley et al. |
| 9,855,610 | B2 | 1/2018 | Frank |
| 9,975,182 | B2 * | 5/2018 | Stoyanov ............... B23B 27/14 |
| 2016/0377140 | A1 | 12/2016 | Frota De Souza Filho |
| 2017/0197258 | A1 | 7/2017 | Frota De Souza Filho et al. |

FOREIGN PATENT DOCUMENTS

| CN | 207076976 | 3/2018 | |
| EP | 3210703 A1 * | 8/2017 | ............... B22F 7/06 |
| JP | 07285002 | 10/1995 | |
| JP | 08085007 | 4/1996 | |
| WO | WO 2016/129229 A1 | 8/2016 | |
| WO | 2017148696 W | 9/2017 | |
| WO | WO 2018/077495 A1 | 5/2018 | |

* cited by examiner

*Primary Examiner* — Alan Snyder
(74) *Attorney, Agent, or Firm* — Bookoff McAndrews

(57) ABSTRACT

A tool for a boring machine includes an elongated elongated body extending longitudinally from a proximal end to a distal end, the distal end being shaped to receive a cutting tip, and a cavity inside the body. The tool includes a lattice provided within the cavity and a powder provided in the cavity with the lattice.

19 Claims, 4 Drawing Sheets

DAMPED BORING BAR

TECHNICAL FIELD

The present disclosure relates generally to cutting tools, and more particularly, to boring bars that may be used in turning or boring processes.

BACKGROUND

In one process of machining a workpiece, a securing device, such as a lathe, fixes the workpiece and brings the workpiece into rotation. A cutting tool is brought into a desired position adjacent to the workpiece and drawn into contact with the rotating workpiece. A hard edge of the cutting tool may remove material as the workpiece rotates. The cutting tool can be used to remove material from an outer surface of the workpiece in a process termed "turning." The cutting tool may also be used to remove material from within a pre-drilled hole in the workpiece, thereby enlarging the hole, in a process termed "boring."

In a boring procedure, the cutting tool, known as a boring bar, is elongated to provide sufficient depth to the machined bore in the workpiece. The elongated shape of the boring bar may promote vibration of the boring bar during machining. This vibration, also known as chatter, may increase during the boring process due to resonance between the workpiece and the boring bar. Thus, even relatively minor initial vibrations can result in significant chatter and workpieces with uneven and roughened machined surfaces. Prior attempts to reduce chatter require modifying the turning or boring process, for example by altering the speed of rotation of the workpiece, or incorporating damping mechanisms in the boring bar. However, prior attempts may introduce additional complexity to the machining process and/or require the use of boring bars that are difficult to manufacture, yet still fail to fully reduce chatter.

U.S. Patent Application Publication No. 2016/0377140 to Frota de Souze Filho ("the '140 publication"), describes damping systems for boring bars. In the '140 publication, a dynamic vibration absorber is disposed in a cavity of the boring bar. An elastomeric buffer is arranged in a spacing between one or more surfaces of the absorber and a cavity wall. The elastomeric material is injected into the spacing between the absorber and the cavity walls via one or more conduits in the boring bar. While the boring bar damping system of the '140 publication may be useful, one or more of the manufacture, strength, and damping characteristics may be improved. The systems and methods of the present disclosure may solve one or more of the problems set forth above and/or other problems in the art. The scope of the current disclosure, however, is defined by the attached claims, and not by the ability to solve any specific problem.

SUMMARY

In one aspect, a tool for a boring machine may include an elongated body extending longitudinally from a proximal end to a distal end, the distal end being shaped to receive a cutting tip, and a cavity inside the body. The tool may include a lattice provided within the cavity and a powder provided in the cavity with the lattice.

In another aspect, a boring bar may include a monolithic body formed by additive manufacturing and extending longitudinally from a proximal end to a distal end, the distal end shaped to receive a cutting tip, and a cavity inside the body. The boring bar may also include a lattice provided within the cavity, the lattice formed by additive manufacturing, and an inner surface of the body completely enclosing the lattice.

In yet another aspect, a boring bar may include, a monolithic body extending longitudinally from a proximal end to a distal end, the proximal end shaped to be secured by a tool holder, the distal end shaped to secure a cutting tool, and a bore extending from the proximal end of the body. The boring bar may include a completely enclosed cavity within the body at the distal end of the body, a wall that separates the bore from the cavity, and a lattice disposed within the cavity. The boring bar may include a powder enclosed within the cavity, wherein the body, wall, lattice, and powder are all formed by additive manufacturing.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. As used herein, the term "elongated" is used to describe a feature that extends farther in a length direction as compared to a width direction.

In this disclosure, relative terms, such as, for example, "about," "substantially," "generally," and "approximately" are used to indicate a possible variation of ±10% in a stated value. Although the current disclosure is described with reference to a boring bar, this is only exemplary. While the present disclosure will be discussed in connection with a boring machine or lathe, it is understood that the current disclosure can be applied as to any machine that employs an elongated arm or body that may experience chatter.

Figure 1:
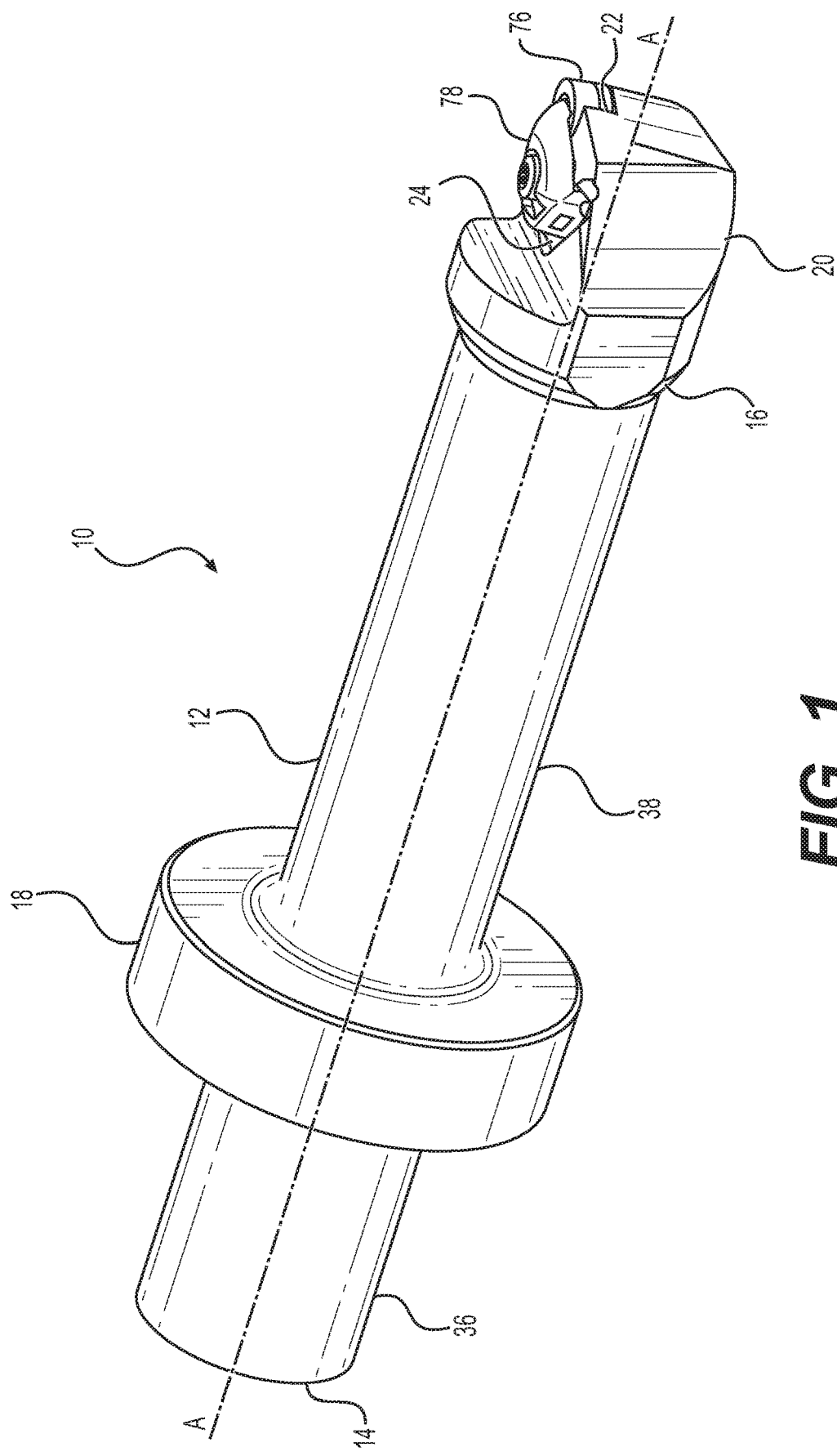
FIG. 1 is a perspective view of a boring bar according to aspects of this disclosure.

FIG. 1 illustrates a perspective view of a cutting tool such as a boring bar 10, according to aspects of the present disclosure. Boring bar 10 may have a monolithic structure that includes an elongated body 12 extending along a longitudinal axis A-A. Body 12 is elongated in the sense that a length of boring bar 10 (as measured in a direction along or parallel to longitudinal axis A-A) is greater than a width of boring bar 10. Body 12 includes a proximal end 14 and an opposing distal end 16. A flange 18 may be positioned closer to proximal end 14 than distal end 16. Body 12 may further include a proximal portion 36 that extends from flange 18 to proximal end 14. Proximal portion 36 may be shaped so as to be received by a chuck of a CNC (computer numeric control) machine such a lathe. A distal portion 38 may extend from flange 18 to distal end 16 of body 12.

Distal end 16 of boring bare 10 may include a head 20, which may be monolithically formed with, and part of, elongated body 12. Alternatively, head 20 may be formed as a separate component that is permanently fixed to or removable from body 12. If head 20 is removable from body 12, distal end 16 may include a fixation mechanism (e.g. threading) that receives a complementary feature (e.g. threading) of a removable head. Head 20 may include a cutting tip mounting surface 22 shaped to receive a complementary cutting tip 76. The shape of cutting tip mounting surface 22 may be of any shape that provides support to cutting tip 76. As can be seen in FIG. 1, cutting tip 76 may have a circular or cylindrical shape. However, cutting tip 76 may also have a triangular, rectangular, square, diamond, or any other shape. An adjacent cutting tip clamp mounting surface 24 may be formed within head 20 (see also FIG. 2) so as to receive a clamp 78 that secures the cutting tip 76 to head 20.

Figure 2:
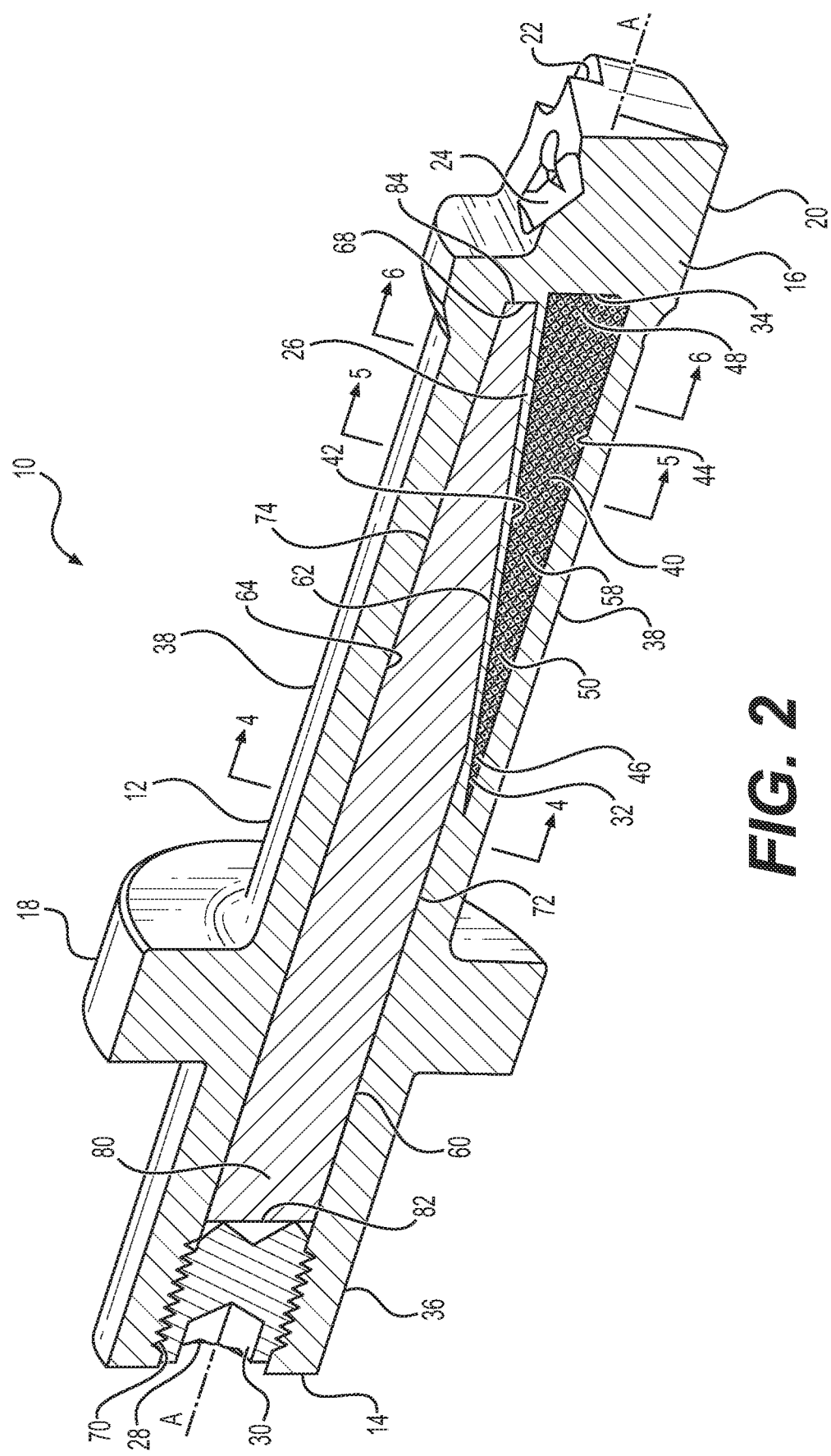
FIG. 2 is a cross-sectional view of the boring bar of FIG. 1.

FIG. 2 is a cross-sectional view of the boring bar 10 shown in FIG. 1 with cutting tip 76 and clamp 78 removed. As can be seen in FIG. 2, elongated body 12 may be formed with a first cavity 40 and a second cavity 60. First cavity 40 and second cavity 60 may be separated from one another by a dividing wall or divider 26.

Figure 5:
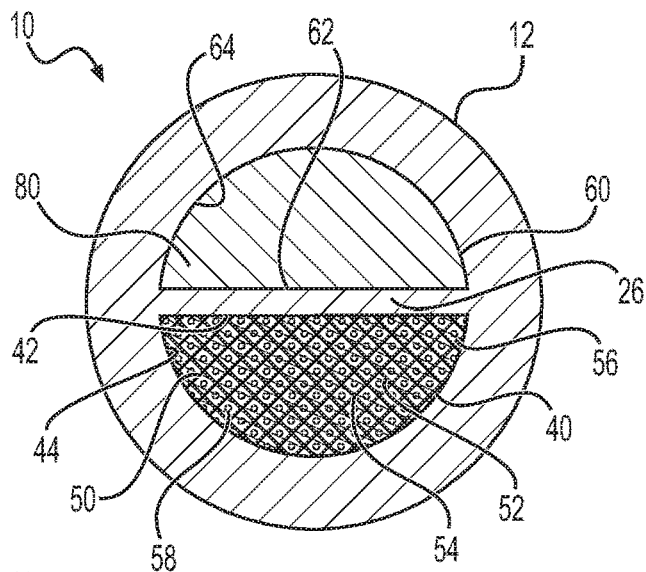
FIG. 5 is a cross-sectional view along line 5-5 of FIG. 2.
Figure 6:
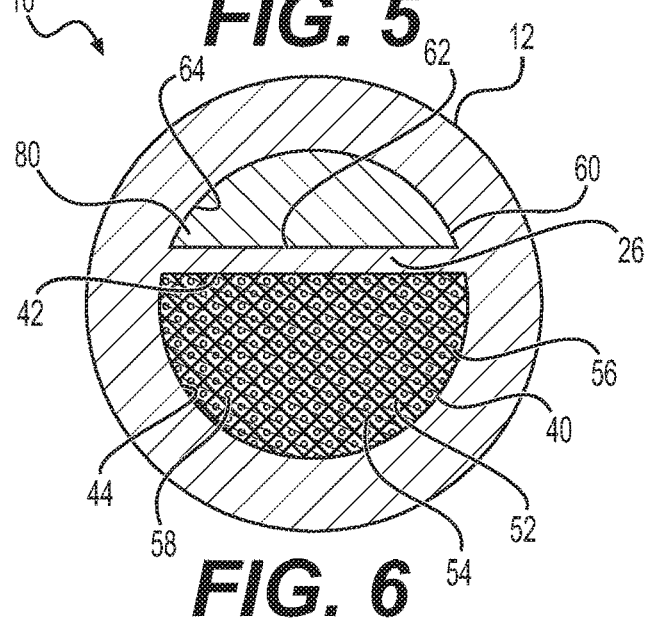
FIG. 6 is a cross-sectional view along line 6-6 of FIG. 2.

First cavity 40 may be provided within a distal portion 38 of body 12 and extend to the distal end 16 of body 12. First cavity 40 may include a proximal end 46 and a distal end 48, and include a taper from the distal end 48 to the proximal end 46. For example, with reference to FIGS. 2, 5, and 6, first cavity 40 may include a distal endwall 34, a proximal endwall 32 opposite distal endwall 34, an inclined wall 42 forming a flat boundary from distal endwall 34 to proximal endwall 32, and a circumferentially-extending wall 44 extending from opposite sides of inclined wall 42 and from distal endwall 34 to proximal endwall 32. Proximal endwall 32 may form a point of convergence between inclined wall 42 and the circumferential wall 44. Distal endwall 34 may extend approximately orthogonal to axis A-A. Thus, first cavity 40 includes a distal end 48 having a larger size (e.g. a larger cross-sectional area as measured in a plane orthogonal to axis A-A) than a size of proximal end 46 of first cavity 40. As best shown in FIGS. 5 and 6, first cavity 40 may be have a shape corresponding to a cylinder having a angled planar portion removed. When referencing cutting tip mounting surface 22 and cutting tip clamp mounting surface 24 as located at a top of boring bar 10, inclined wall 42 forms a top portion of first cavity 40, and circumferentially-extending wall 44 forms a bottom portion of first cavity 40. Walls 42 and 44 together provide an inner surface of body 12 that completely encloses first cavity 40. First cavity 40 may be entirely sealed, or enclosed, by body 12 so that cavity does not include any conduits or pathways allowing access to first cavity 40. As used herein, a cavity that is completely enclosed does not include any conduits or passageways leading out of the cavity, including conduits or passageways that are filled with a material provided in the cavity. It is understood that first cavity 40 can have a different shape and relative size than that depicted in the FIGS. 2, 5, and 6. For example, proximal endwall 32 could be formed orthogonal to axis A-A, rather than as the point of convergence shown in FIG. 2. Further, while proximal endwall 32 may be disposed between flange 18 and head 20, endwall 32 may be provided at other locations to increase or decrease the length of first cavity 40 along axis A-A. In one aspect, proximal endwall 32 may extend farther in a direction toward proximal end 14 of boring bar 10 and be provided at or near flange 18. In such a configuration, an angle of inclination of divider 26 may be reduced.

As can be seen in FIG. 2, a lattice 50 may be formed within first cavity 40. Lattice 50 may be formed from the same material as body 12, and may, for example, be formed monolithically with body 12 by an additive manufacturing process. In one aspect, lattice 50 may substantially fill first cavity 40 and extend to inclined wall 42, circumferential wall 44, proximal endwall 32, and distal endwall 34. In such a configuration, lattice 50 may be substantially the same size as first cavity 40. Lattice 50 may engage walls of first cavity 40, for example by engaging only inclined wall 42 and circumferential wall 44, or by engaging all of inclined wall 42, circumferential wall 44, proximal endwall 32, and distal endwall 34. In one aspect, lattice 50 may be formed by a regularly (or irregularly) repeating series of strut members 52 that are connected to each other at joints 54 (see FIGS. 5 and 6). Lattice 50 may form a repeating pattern of spaces 56 between the strut members 52 and joints 54.

A powder 58 may substantially fill the entirety of first cavity 40—including the spaces 56 of lattice 50. Powder 58 may be formed of the same material as body 12, and/or the same material as lattice 50. In one aspect, body 12, lattice 50, and powder 58 may be formed of the same material. Specifically, body 12 and lattice 50 may be formed of a sintered metal, while powder 58 is formed of the same metal material in an unsintered form. Thus, powder 58 may be disconnected from body 12 and move relative to body 12 to form a vibration-absorbing sub stance.

Figure 4:
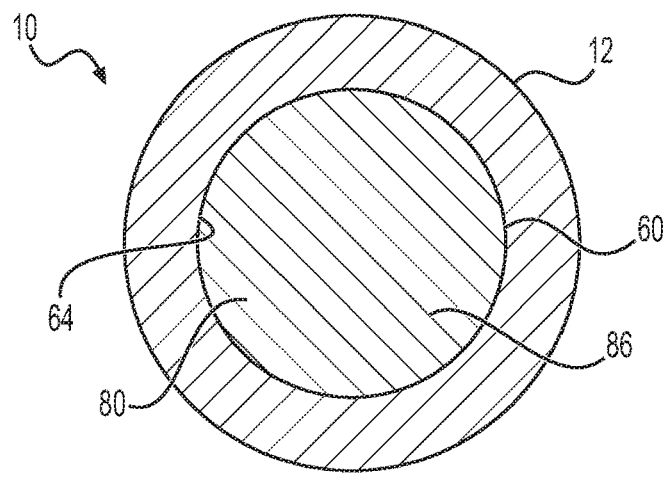
FIG. 4 is a cross-sectional view along line 4-4 of FIG. 2.

With continued reference to FIG. 2, and as noted above, a second cavity 60 may also extend within body 12. Second cavity 60 may be defined by an inclined wall 62 located within distal portion 38 of body 12. According to one aspect, inclined wall 62 may be the same wall as inclined wall 42 of the first cavity 40, and the divider 26. Referring to FIGS. 4-6, the remainder of the second cavity 60 may be defined by a circumferential wall 64 of body 12. Circumferential wall 64 may extend from opposite sides of inclined wall 62 within a distal portion 74 of second cavity 60 (see FIGS. 5 and 6). Circumferential wall 64 may extend 360 degrees so as to surround second cavity 60 at a proximal portion 72 of second cavity 60.

Second cavity 60 may extend within proximal portion 36 and distal portion 38 of body 12. Also, as shown in FIG. 2, second cavity 60 may extend from a proximal opening 28 to a distal endwall 68. Thus, second cavity 60 may have a shape that is not fully enclosed by body 12. Distal endwall 68 of second cavity 60 may instead be approximately aligned with the distal endwall 34 of first cavity 40. However, distal endwalls 34 and 68 may be offset from each other along longitudinal axis A-A. The portion of circumferential wall 64 extending from proximal opening 28 of second cavity 60 may be formed with threading 70.

With continued reference to FIG. 2, second cavity 60 may receive a tapered insert 80 that has a complementary shape to second cavity 60. Insert 80 may be formed of a material such as a carbide (e.g. one or more of tungsten carbide, titanium carbide, and tantalum carbide) and may have a stiffness that is sufficient to reduce or eliminate deflection of boring bar 10. Insert 80 may overlap lattice 50 in a longitudinal direction of body 12 (e.g. along axis A-A). As shown, the overlap may extend substantially the entire longitudinal distance of the lattice 50, however, it is understood that the overlap may extend less or more than the longitudinal distance of lattice 50.

A set screw 30 may be provided within second cavity 60. Specifically, as can be seen in FIG. 2, set screw 30 may include threads that engage the internal threading 70 of second cavity 60. Set screw 30 may apply a compressive force against a proximal endwall 82 of insert 80 so as to press a distal endwall 84 of insert 80 against distal endwall 68 of second cavity 60 with a predetermined compressive force. Thus, set screw 30 may close proximal opening 28.

Figure 3:
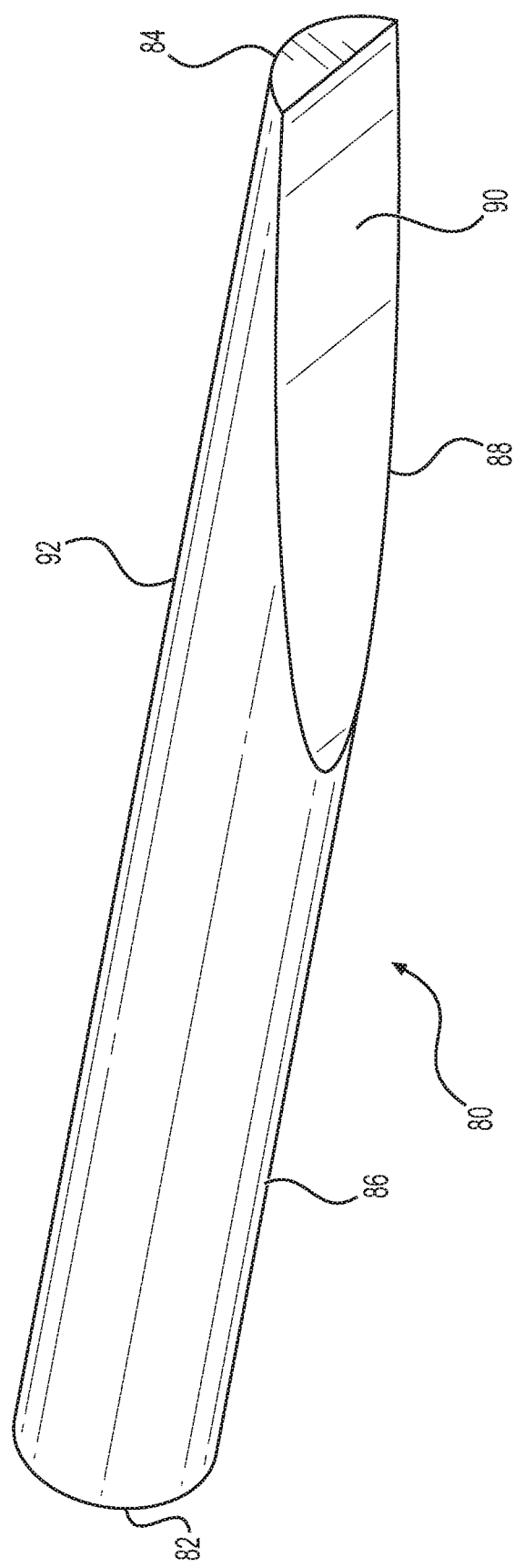
FIG. 3 is a perspective view of an insert of the boring bar of FIG. 1.

Thus, as shown in FIG. 2, first cavity 40 and second cavity 60 may each have mirroring tapered portions that taper along longitudinal axis A-A. As noted above, first cavity 40 may be provided so as to have an increasing cross-sectional area (as measured in a plane orthogonal to longitudinal axis A-A) from proximal end 14 toward distal end 16. Whereas, second cavity 60 may have a decreasing cross-sectional area (as measured in a plane orthogonal to longitudinal axis A-A) in a distal portion 74 that extends from a proximal portion 72. Second cavity 60 may also extend more proximally than first cavity 40, and, as best shown in FIGS. 3 and 4, may include a region in which the cross-sectional area is approximately constant, such as within proximal portion 72. In the area in which first cavity 40 and second cavity 60 overlap, the cross-sectional areas of first cavity 40 and second cavity 60 (as measured in a plane orthogonal to longitudinal axis A-A) may be inversely proportional to each other when considered at two or more locations along longitudinal axis A-A. Thus, cross-sectional areas of first cavity 40 and second cavity 60 may respectively increase and decrease in a direction toward distal end 16. The rate at which the cross-sectional area of first cavity 40 increases (when considered at different positions toward distal end 16), and the rate at which the cross-sectional area of second cavity 60 decreases (when considered at different positions toward distal end 16), in an area at which the cavities 40 and 60 overlap with each other, may be approximately the same. Thus, an inclination of the tapered regions of the first cavity 40 and second cavity 60 may be approximately equal.

FIG. 3 is a perspective view illustrating an exemplary insert 80 of boring bar 10. As can be seen in FIG. 3, insert 80 may be substantially cylindrically-shaped so as to extend between a proximal endwall 82 and a distal endwall 84. Proximal endwall 82 may have an approximately circular shape. This circular shape may extend through an entirety of proximal portion 72 of second cavity 60. A substantially cylindrical proximal portion 86 may have a circular cross-sectional shape along an entirety thereof. Additionally, proximal portion 86 may have a shape that corresponds to the shape of proximal portion 72 of second cavity 60. Distal end 84 of insert 80 may have a flat surface facing longitudinal axis A-A and forming an approximately semicircular shape or the shape of a circular segment when viewed from axis A-A. A tapered portion 88 may extend from proximal portion 86 and form a transitional area in which the cross-sectional area of insert 80 gradually decreases or tapers from proximal end portion 86 to distal endwall 84. Tapered portion 88 may include an approximately flat, inclined surface 90. In one aspect, inclined surface 90 may form an angle of approximately 5-15 degrees with respect to longitudinal axis A-A. However, other angles may be formed between inclined surface 90 and longitudinal axis A-A. A circumferential surface 92 of insert 80 extends from opposite sides of inclined surface 90.

As shown in FIG. 2, inclined surface 90 may be formed so as to face and contact a portion of divider 26 that defines inclined wall 62. As can be seen in FIG. 2, the angle of inclination of divider 26 may be substantially the same as the angle of inclination of inclined surface 90. Thus, the portions 86 and 88 of insert 80 may be formed with shapes that closely match the corresponding interior surfaces of second cavity 60. Additionally, proximal end 82 may have a shape that is substantially flat and shaped to receive a pressing surface of set screw 30, while distal end 84 may have a shape that closely matches distal wall 68 of the second cavity 60.

FIGS. 4-6 illustrate a series of sectional views taken along lines 4-4, 5-5, and 6-6, respectively, of FIG. 2. Turning first to FIG. 4, a relationship between body 12 and insert 80 within second cavity 60 is illustrated. As can be seen in FIG. 4, proximal portion 86 may have a substantially circular cross-sectional shape that corresponds to the cross-sectional shape of second cavity 60. However, other cross-sectional shapes (e.g. rectangular, circular, triangular, etc.) may also be employed for the shape of proximal portion 86 and the corresponding shape of second cavity 60. Regardless of the shape of insert 80, proximal portion 86 of insert 80 may be surrounded by wall 64 of body 12. When proximal portion 86 of insert 80 has a circumferentially-shaped surface, wall 64 may have a circular (circumferential) shape, as shown in FIGS. 4-6.

FIG. 5 illustrates a cross-sectional view along line 5-5 of FIG. 2. As can be seen in FIG. 5, at a position approximately halfway along first cavity 40, the cross-sectional areas of first cavity 40 and second cavity 60 may be approximately equal to each other. Additionally, the first cavity 40 and second cavity 60 may have semicircular shapes that substantially correspond with each other.

FIG. 6 illustrates a sectional view along line 6-6 of FIG. 2. Thus, FIG. 6 shows boring bar 10 at a position that is closer to distal end 16 as compared to the positions of FIGS. 4 and 5. As can be seen in FIG. 6, first cavity 40 and second cavity 60 may each have cross-sectional shapes that form circular segments. First cavity 40 may have a cross-sectional shape that forms a circular segment smaller than a semicircle. Second cavity 60 may have a cross-sectional shape that forms a segment that is larger than a semicircle.

As shown in FIGS. 5 and 6, and as mentioned above, lattice 50 may extend to interior walls of the cavity 40. Thus, lattice 50 may be a rigid structure that provides support to divider 26 via inclined wall 42. This support may allow divider 26 to be formed with a relatively small thickness to provide for a relative large first cavity 40. Additionally, the rigid structure of lattice 50 may provide support to divider 26, allowing an increased cross-sectional area in distal portion 48 and corresponding increase in an amount of powder 58 provided at distal portion 48.

As can also be seen in FIGS. 5 and 6, powder 58 may be substantially uniformly distributed within first cavity 40 and within spaces 56 of lattice 50. Powder 58 may substantially fill the entirety of first cavity 40—including spaces 56. Powder 58 may be made of fine particulate material. For example, powder 58 may have particles that are approximately as fine as particles of sand, or finer. Thus, even when powder 58 fills substantially all of the first cavity 40, individual particles of powder 58 may be able to move relative to each other when body 12 experiences movement, particularly vibration. This movement of particles of powder 58 may result in the absorption of vibration and produce a damping effect.

In one aspect, the body 12, lattice 50, and powder 58 may each be made of a material that is compatible with an additive manufacturing process and which provides sufficient strength for use as a cutting tool. In one aspect, one or more of body 12, lattice 50, and powder 58 may be a metal material, such as a stainless steel. In another aspect, one or more of body 12, lattice 50, and powder 58 may be formed of 17-4 stainless steel or 316 L stainless steel. However, other materials may also be employed for one or more of body 12, lattice 50, and powder 58.

INDUSTRIAL APPLICABILITY

The disclosed aspects of boring bar 10 may be used in any machining device. For example, boring bar 10 may be employed in machining devices that removes material from an exterior or an interior of a rotating workpiece.

As noted above, the disclosed boring bar 10 and/or lattice 50 may be manufactured using techniques generally referred to as additive manufacturing, additive fabrication, or 3D printing. Such a process deposits material in successive layers under the control of a computer until the device is fully formed. The layers may be deposited in a melted (flowable) or partially-melted form. The computer may control additive fabrication equipment to deposit the successive layers according to a three-dimensional model (e.g. a digital file such as an AMF or STL file). The model is converted into a plurality of slices, for example substantially two-dimensional slices, that each define a cross-sectional layer of the part. In one case, the boring bar 10 may be an original component and the 3D printing process would be utilized to manufacture the boring bar 10.

Additive manufacturing/fabrication or 3D printing processes may include techniques such as, for example, powder bed fusion, which may produce boring bar 10. In powder bed fusion, which may also be referred to as selective laser melting, a powder such as a metal powder of one or more of the materials discussed above, is deposited in a layer-by-layer manner. After a layer of powder is deposited, a laser controlled by a computer, for example, may selectively melt or sinter portions of the deposited layer of powder, permanently fusing predetermined regions of the powder bed while allowing surrounding regions to remain in powdered form. Additional layers may be added sequentially, for example by a roller controller by the computer, each layer being selectively fused to adjacent layers by the operation of the laser. The computer may control the laser and roller, along with assisting equipment, to deposit and sinter successive layers according to the three-dimensional model. Thus, boring bar 10 may be formed in a layer-by-layer manner such that body 12 and lattice 50 may be monolithically formed with respect to each other. Powder 58 may be formed of portions of each layer of powder that were not sintered by the computer-controlled laser.

The additive manufacturing process utilized to construct the boring bar 10 may include additional processes performed to create a finished product. Such additional processes may include, for example, one or more of cleaning, hardening, heat treatment, material removal, and polishing. Other processes necessary to complete a finished product may be performed in addition to or in lieu of these processes.

As described above, an additive manufacturing process may provide body 12 and lattice 50 as an integral and/or monolithic body. Powder 58 may be enclosed within first cavity 40 by employing an additive manufacturing process. Once the additive manufacturing process has completed, including any additional processes, if necessary, tapered insert 80 may be passed through opening 28 and positioned such that inclined surface 90 is slid into contact with inclined wall 62. Set screw 30 may then be rotated to engage internal threading 70 until an end of set screw 30 engages proximal endwall 82 of tapered insert 80, applying a predetermined compressive force that presses distal endwall 84 against distal wall 68 of second cavity 60. Cutting tip 76 may then be mounted to mounting surface 22 and secured in place by clamp 78. Boring bar 10 may then be used in a machining operation.

During a machining operation (e.g. turning or boring) such as boring in which boring bar 10 is used to machine a workpiece, cutting tip 76 may be used to remove material from a workpiece. Cutting tip 76 protrudes beyond head 20 at by a predetermined amount. A chuck of a CNC machining device may secure proximal portion 36 of boring bar 10 therein. If desired, proximal portion 36 may be provided with a series of grooves, may be provided in a polygonal shape, and/or may be provided with one or more flat surfaces to improve the retention of boring bar 10 in the chuck of the machining device. Boring bar 10 may then be translated, by the machining device, until cutting tip 76 contacts a rotating workpiece so as to remove material therefrom. Cutting tip 76 may be made of a carbide material having a hardness sufficient to perform a machining operation.

During a boring operation, boring bar 10 may be progressively extended into a pre-drilled bore so as to remove material from a side wall that defines the bore. Thus, as boring bar 10 removes material so as to enlarge a bore, vibration may tend to occur, particularly if boring bar 10 is elongated with an extended length. However, powder 58 enclosed within first cavity 40 may absorb some or all of the force of vibration. Thus, a level of vibration may be prevented from reaching a magnitude that is capable of affecting a machining operation. The first cavity 40 is located at the distal end 16 of the boring bar 10 to facilitate the dampening of vibration forces that originate and may be larger at the free end of the boring bar 10. At the distal end 16 of the boring bar 10, the overlap between the tapered insert 80 and the lattice 50 help to provide additional structural support or stiffness to the boring bar 10. Thus, an increased amount of powder 58 may be provided in the area where vibration originates while maintaining resistance to deflection.

It will be apparent to those skilled in the art that various modifications and variations can be made to the disclosed boring bar without departing from the scope of the disclosure. Other embodiments of the machine will be apparent to those skilled in the art from consideration of the specification and practice of the tool for a boring machine and boring bar disclosed herein. It is intended that the specification and examples be considered as exemplary only, with a true scope of the disclosure being indicated by the following claims and their equivalents.

What is claimed is:

1. A tool for a boring machine, comprising:
   a body extending longitudinally from a proximal end to a distal end, the distal end being shaped to receive a cutting tip;
   a first cavity inside the body;
   a lattice provided within the first cavity;
   a second cavity inside the body;
   an insert at a proximal portion of the second cavity, the insert tapering toward the distal end of the body, the insert and the lattice overlapping each other in a longitudinal direction of the body; and
   a powder provided in the first cavity with the lattice.

2. The tool according to claim 1, wherein the first cavity has a tapered shape.

3. The tool according to claim 1, wherein the lattice extends from a proximal end of the first cavity to a distal end of the first cavity.

4. The tool according to claim 3, wherein the body is monolithically formed with the lattice.

5. The tool according to claim 1, wherein the powder substantially fills the first cavity.

6. The tool according to claim 5, wherein the first cavity has a cross-sectional area that increases from the proximal end of the body toward the distal end of the body.

7. The tool according to claim 1, wherein the first cavity is completely enclosed by the body.

8. The tool according to claim 1, wherein the first cavity is separate from the second cavity.

9. A boring bar, comprising:
a monolithic body formed by additive manufacturing and extending longitudinally from a proximal end to a distal end, the distal end shaped to receive a cutting tip;
a first cavity and a second cavity inside the body, the second cavity overlapping with the first cavity and extending more proximal than the first cavity;
a lattice provided within the cavity, the lattice formed by additive manufacturing; and
an inner surface of the body completely enclosing the cavity.

10. The boring bar according to claim 9, wherein the lattice is monolithically formed with the body.

11. The boring bar according to claim 9, wherein the cavity is located at the distal end of the boring bar.

12. The boring bar according to claim 11, wherein the cavity has a proximal end and a distal end, the distal end having a larger cross-sectional area as compared to a cross-sectional area of the proximal end of the cavity.

13. The boring bar according to claim 9, wherein a powder is enclosed within the cavity.

14. The boring bar according to claim 13, wherein the powder is an unsintered metal powder.

15. The boring bar of claim 9, further including an insert within the body, the insert having a tapered distal end portion positioned within a distal end portion of the body.

16. The boring bar of claim 9, further including an insert within the body, wherein the lattice extends adjacent to a distal end of the insert.

17. A boring bar, comprising:
a monolithic body extending longitudinally from a proximal end to a distal end, the proximal end shaped to be secured by a tool holder, the distal end shaped to secure a cutting tool;
a bore extending from the proximal end of the body;
a completely enclosed cavity within the body at the distal end of the body;
a wall that separates the bore from the cavity;
a lattice disposed within the cavity; and
a powder enclosed within the cavity, wherein the body, wall, lattice, and powder are all formed by additive manufacturing.

18. The boring bar according to claim 17, wherein the wall is inclined with respect to a longitudinal axis of the body.

19. The boring bar according to claim 17, wherein the lattice engages walls of the cavity.

* * * * *